United States Patent
Smith et al.

[11] 3,710,616
[45] Jan. 16, 1973

[54] APPARATUS AND METHOD FOR STRESS CRACK RESISTANCE TESTING

[75] Inventors: Vernon J. Smith; Ben W. Heinemeyer, both of Lake Jackson, Tex.

[73] Assignee: The Dow Chemical Company, Midland, Mich.

[22] Filed: Sept. 23, 1970

[21] Appl. No.: 74,731

[52] U.S. Cl.............73/88 R, 23/230 C, 23/253 C, 204/1 T, 204/195 R
[51] Int. Cl.............G01b 7/16, G01n 3/20
[58] Field of Search........23/230 C, 253 C; 204/1 T, R; 204/195 R; 324/54; 73/88

[56] References Cited

UNITED STATES PATENTS 3,366,565  1/1968  Bokshitsky et al............... 204/195 R

*Primary Examiner*—Morris O. Wolk
*Assistant Examiner*—R. M. Reese
*Attorney*—Griswold & Burdick, Lester J. Dankert and Michael S. Jenkins

[57] ABSTRACT

Apparatus and method for stress crack resistance testing of plastic articles wherein a weighted rod stresses the plastic article in contact with a stress crack agent and an electrically conductive liquid until the liquid penetrates the stress cracks which appear. The liquid closes an electric circuit and the signal thus developed is recorded as a function of time.

11 Claims, 6 Drawing Figures

PATENTED JAN 16 1973

INVENTORS.
Vernon J. Smith
Ben W. Heinemeyer
BY Griswold & Burdick
ATTORNEYS

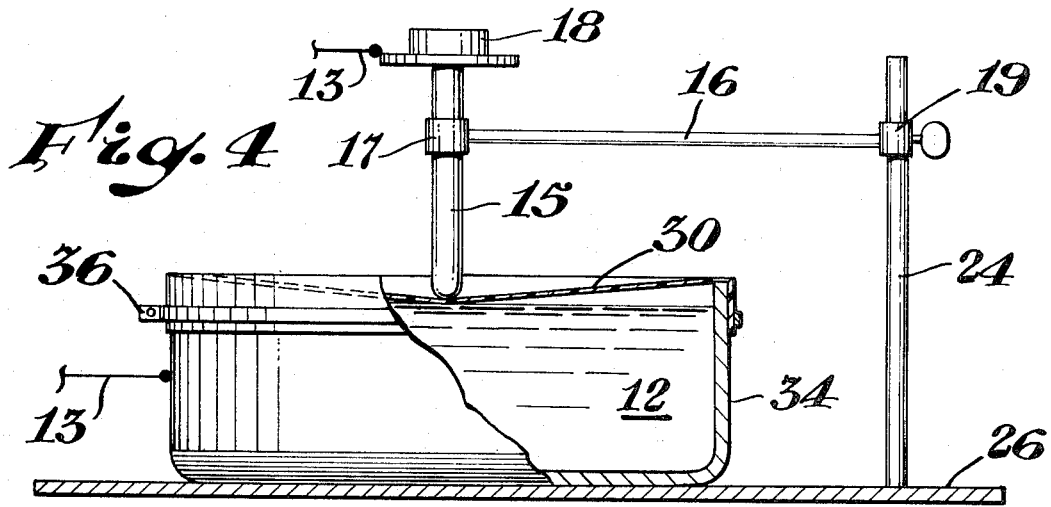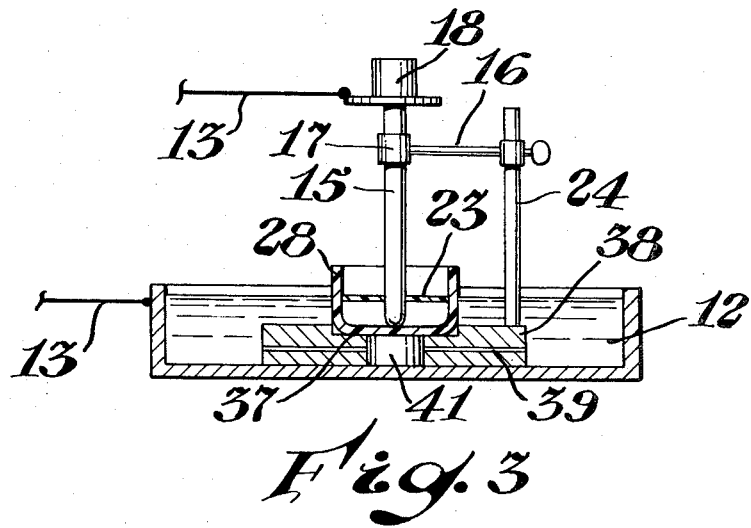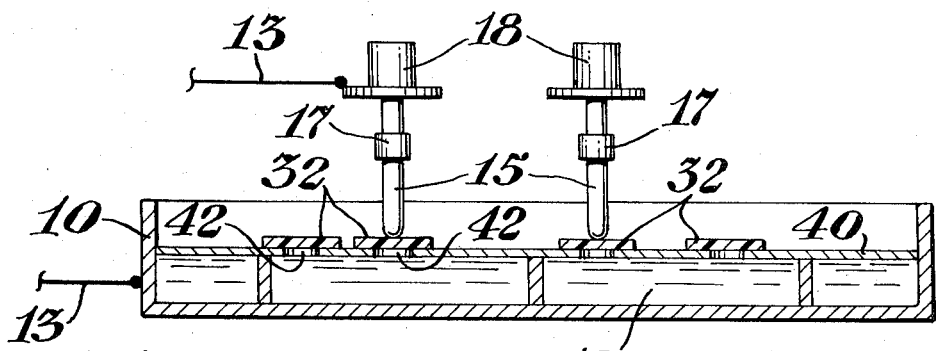

APPARATUS AND METHOD FOR STRESS CRACK RESISTANCE TESTING

BACKGROUND OF THE INVENTION

This invention relates to a method for the environmental stress crack resistance testing of plastic articles and apparatus for carrying out the method.

It is known that the stress crack resistance of low density polyethylene can be visually observed by following ASTM D-1963-60T wherein a test sample is nicked with a razor blade, bent into a U shaped configuration and submerged into a solution of a surface-active agent.

It is also known to test the stress crack resistance of polymer articles by providing a weighted rod depressing on an inverted plastic container with a small pool of a surface-active agent at, and adjacent to, the point of contact. A microswitch adjacent the rod is activated by the rod to record the time for failure when the test specimen fails and the rod drops.

Still another known method of determining stress crack resistance is to tape steel balls on the underside of a relatively flat injection molded polyethylene container in the sprue area, fill the container with a solution of a stress crack agent, and periodically observe the bottom surface for the formation of stress cracks.

These known methods of testing suffer from the disadvantage that they either require constant visual surveillance or are insensitive in that the first occurrence of minute stress cracks are not detected.

SUMMARY OF INVENTION

The present invention is directed towards solving the problems inherent in the prior art in that it provides a method of testing environmental stress crack resistance of plastic articles which are susceptible to stress cracking and apparatus for carrying out the method in which the test is carried out without constant monitoring by the operator.

The method comprises the steps of providing a stress crack agent and an electrically conductive liquid on at least one side of a polymer article, applying a uniform stress means to the side of said article in contact with said stress crack agent, providing an electrical potential between said conductive liquid and the opposite side of said article, and recording the time of failure of said plastic article by the flow of an electrical current between said liquid and said stress means which is indicative of the penetration of said liquid through stress cracks generated in said article due to the stress means and stress crack agent.

The invention is applicable to the testing of plastic articles susceptible to stress cracking such as articles prepared from vinyl aromatic polymers and ethylene polymers. Typical articles are injection molded containers, compression molded plaques, cast films, and the like.

The apparatus by which the method is carried out comprises container means for holding a stress crack agent, and an electrically conductive liquid and at least one plastic article therein, conductive stress means slideably mounted above said container means and insulated therefrom so that the stress means contacts one side of a plastic article positioned on said container means with the immediate opposite side of said plastic article contacting said stress crack agent, voltage generating means electrically connected to said conductive liquid and to said stress means, and recorder means electrically connected in series with said stress means and said voltage generating means whereby failure of the plastic article due to the leakage of said conductive liquid through said article is indicated by an electrical current flowing through said recorder, stress means, and conductive liquid which is recorded as a function of time.

DETAILED DESCRIPTION

The apparatus aspect of the invention is illustrated by the drawings wherein:

FIG. 3 shows a modified version similar to FIG. 2.

FIG. 4 shows a further modification adapted to the testing of cast films.

FIG. 5 shows a modified version similar to FIG. 1 adapted to the testing of molded plaques.

Figure 1:
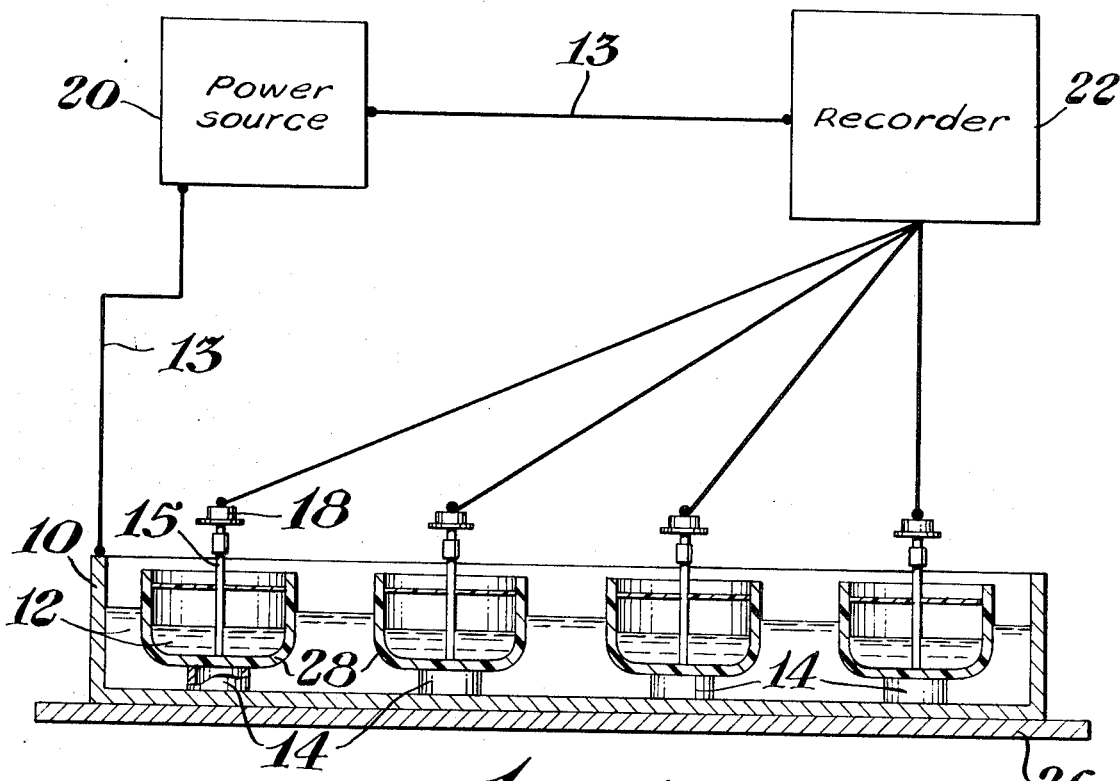
FIG. 1 shows one embodiment of the testing apparatus in partial cross-section.

In FIG. 1, the tank 10, which is metallic in this instance, is illustrated on a base support 26. In the tank 10, there is liquid 12 which is a chemical stress crack agent and an electrically conductive liquid. An example of such liquid is an aqueous solution of about 0.1 to about 99.0 percent by weight of an alkyl phenol ethylene oxide condensate such as nonyl phenoxy polyoxyethylene ethanol (Igepal CO-630). Other related detergents that can be substituted for the nonyl phenoxy polyoxyethylene ethanol are alkylbenzene sulfonates such as dodecyl benzene sulfonate (Ardet AB-40), sodium dialkyl sulfosuccinate (Aerosol AY), alkyl sulfates such as sodium lauryl sulfate (Avirol 101), and the like. Other stress crack agents that can be used are organic liquids containing a small amount of dissolved water such as acetone/water solutions.

In most cases the above solutions will be conductive enough by themselves, but some cases it may be desirable to add electrolytes such as sodium chloride, sodium sulfate, and ammonium chloride to raise the level of conductivity.

For the purposes of this invention, an electrically conductive liquid is one having a conductivity greater than $4 \times 10^{-8}$ mhos per centimeter.

Inside the tank 10, the plastic test containers or plastic articles 28 are immersed in the conductive liquid 12 with or without the conductive liquid 12 being located in the test containers 28.

The test containers 28 are supported in the tank 10 by cylindrical ring supports 14, located so that they encompass the center area of the bottom of the containers 28 and thus encompass the sprue area of the injection molded containers 28. This is normally the area which first shows signs of stress cracking during exposure to stress crack agents.

The cylindrical ring supports 14 may be provided with holes (not shown) to insure that the stress crack liquid 12 contacts the bottom of the containers 28. In any event, they are placed in the tank before the liquid 12 is poured therein to insure that no air bubbles interfere with the test procedure.

In each container 28 there is placed a metal rod 15 having adjustable weights 18. The rod 15 is supported by guides 17 which are in turn supported by and insulated from, horizontal support rods 16, clamps 19 and vertical support rods 24 mounted in the base member 26.

The rods 15 have the bottom end thereof preferably rounded and polished to a hemispherical shape. This is not absolutely necessary, however, and other shapes such as square or conical may be used if desired.

A power source 20 such as a dry battery or a low voltage transformer is connected in series by wires 13 to the recorder 22, to the weighted rod 15 and to the tank 10. If desired, the power source 20 can be eliminated when using a metal tank 10 such as a galvanized steel tank and a dissimilar metal for the rod 15 such as a steel. In this instance, an electromotive force is generated between the zinc-steel surfaces when the plastic article fails and the conductive liquid contacts the rod 15.

The recorder 22 can be any one of several standard types, such as strip or circular chart recorders, supplemented by visual and/or auditory alarms if desired.

In assembling the apparatus, the use of a guide plate 23 is preferred so that the weighted rod 15 is aligned directly over the sprue area of the test container 28.

Referring more specifically to FIG. 3, the apparatus can be modified by providing the tank 10 with a support block 38 which supports both the vertical support rod 24 and the test containers 28. A relatively large central hole 41 is provided in the support block 38 to provide for access of the conductive liquid 12 to the sprue area on the bottom of the containers 28. Bleeder holes 39 are further provided in the support block 38 to facilitate the flow of liquid 12. In is preferred to also have a circular indentation 37 in the support block 38 of a size and diameter to suit the test containers 28.

It is to be understood that the support block 38 can be unitary with a plurality of holes 41 and rods 24 for each of several test containers 28 or it can be made into several separate blocks as desired.

Referring more specifically to FIG. 4, an alternate form of the apparatus is disclosed for testing plastic films in which a circular tank 34 is used.

The film to be tested 30 is clamped by means of a circular clamp ring 36. The rod 15 is weighted with the appropriate weights 18 so that the rod 15 depresses the film sufficiently so that the film just contacts the conductive fluid 12.

In FIG. 5, a modification of the apparatus is illustrated in which compression molded plastic plaques 32 are tested. In this modification, a tray 40 is provided having a plurality of holes 42 therein which are equal in number to the number of plaques to be tested. The conductive liquid 12 is carefully poured into the tank 10 so that it rises to the level of, and contacts the bottom side of the test plaques 32.

Figure 6:
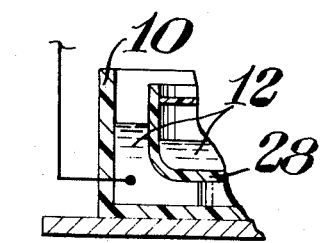
FIG. 6 is a partial view of FIG. 1 showing the electrical connection to the stress crack agent when a non-metallic tank is used.

In FIG. 6, the use of a non-conductive tank 10 is illustrated. In this instance, the wire 13 which contacts the conductive liquid 12 goes through the wall of the tank 10. In this embodiment, the tank 10 can be made of non-conductive material such as glass, plastics, wood, or the like.

In practicing the method or the apparatus of this invention, the stress crack agent can be applied to the internal or external bottom of the articles in a relatively thick layer if it is grease-like and has a high content of fatty acid esters such as in butter, oleomargarine or peanut butter and then submerged into an electrically conductive liquid. Alternatively, if the stress crack agent is a liquid, the articles are partially submerged in, and/or partially filled with, an aqueous solution of the stress crack agent to provide the necessary combination of the stress crack agent and an electrically conductive liquid. In either event, when the stress crack agent causes failure of the plastic article, the conductive liquid flows or seeps into the article to complete the electrical circuit and the resultant current is duly recorded.

Figure 2:
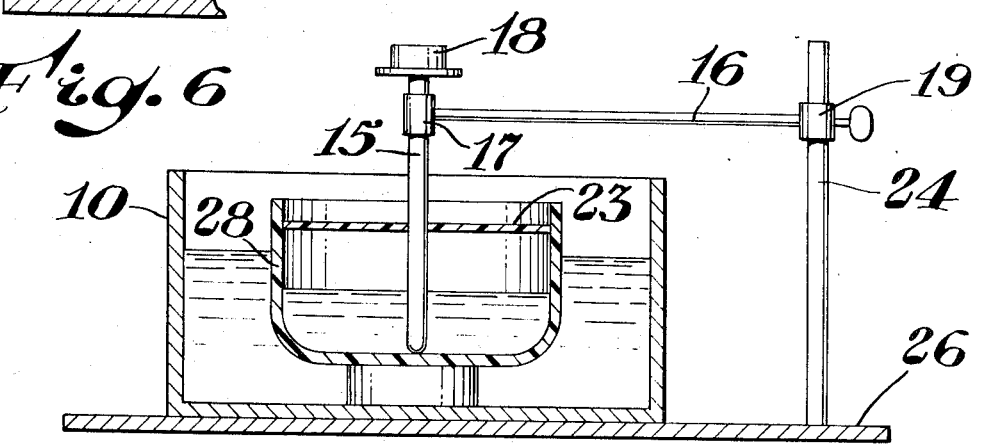
FIG. 2 shows an end view of FIG. 1 in partial cross-section.

It is to be understood that while the invention is illustrated (as in FIG. 1 and 2) as provided for the use of electrically conductive stress means 15, it is also possible in some instances to use a non-conductive stress means 15 and provide an electrical contact (not shown) to the conductive liquid inside the container.

The process aspect of the invention is further illustrated by the following detailed examples.

EXAMPLE 1

Polyethylene having a density of 0.923 and a melt index of 10.0 was injection molded to form a series of quart size containers or pots.

In accordance with this invention, stress crack resistance was tested by using an aqueous solution containing 0.5 percent by weight of Igepal Co-630. Two sets of five pots out of the series were randomly selected for testing. The pots were placed in a metal tray containing the aqueous detergent. Each pot rested on a 2½ inch diameter cylindrical ring support and each contained a portion of the aqueous detergent. The walls of the pots extended well above the surface of the aqueous detergent in order that there was no communication between the liquid in the pots and the liquid in the pan. For each pot, a metal rod was prepared by silver-soldering a one-half inch diameter brass ball on the end of a metal tube. The rod also had a platform on the opposite end upon which was placed a ten pound weight. Each rod was placed in an insulated holder so that the brass ball rested in the center of the pot which was centrally located with respect to the 2½ inch ring support. The holders were loosely fitted around and insulated from each of the metal tubes so as to allow free movement of the weights vertically, but not horizontally.

A wire was attached from each weight to a strip chart recorder and a wire (attached to a 1½ volt D.C. power supply) was attached from the metal pan to the recorder.

The time (in minutes) for each pot to undergo environmental stress cracking was sensed by the recorder when the liquid in the pan contacted the liquid in the pot, thereby completing the electrical circuitry. The temperature of the liquid in the pan was maintained at approximately 24°C.

The high value and low value in each set of the five determinations were discarded and the remaining three were averaged. The results are shown below.

| Minutes to Fail | Run 1 | Run 2 |
|---|---|---|
| | 227 | 230 |

EXAMPLES 2-7

Other polyethylenes having the varying melt indexes and densities were used to injection mold a series of quart size pots.

From each series or runs, 10 pots were randomly selected and tested in accordance with Example 1. The results (time of failure) are shown in Table I.

From the data it is evident that there is a wide variation in the time of failure of the pots due to stress cracking. This is believed to be due to an inherent characteristic of the injection molded pots, i.e. a molded-in stress or stress patterns. The present invention is thus useful to test polymer articles for their stress crack resistance to reach an average value of time in which they will fail without visual examination of each.

TABLE I

| Example | Melt Index | Density | Pot No. | Failure Time (in minutes) |         |
|---------|------------|---------|---------|---------------------------|---------|
| 2       | 8          | 0.926   | 1       | 90                        |         |
|         |            |         | 2       | 110                       |         |
|         |            |         | 3       | 120                       |         |
|         |            |         | 4       | 140                       |         |
|         |            |         | 5       | 130                       |         |
|         |            |         | 6       | 110                       |         |
|         |            |         | 7       | 120                       |         |
|         |            |         | 8       | 100                       |         |
|         |            |         | 9       | 110                       |         |
|         |            |         | 10      | 120                       |         |
|         |            |         |         | 115                       | average |
| 3       | 8          | 0.925   | 1       | 120                       |         |
|         |            |         | 2       | 150                       |         |
|         |            |         | 3       | 160                       |         |
|         |            |         | 4       | 170                       |         |
|         |            |         | 5       | 120                       |         |
|         |            |         | 6       | 170                       |         |
|         |            |         | 7       | 160                       |         |
|         |            |         | 8       | 220                       |         |
|         |            |         | 9       | 200                       |         |
|         |            |         | 10      | 210                       |         |
|         |            |         |         | 175                       | average |
| 4       | 8          | 0.917   | 1       | 360                       |         |
|         |            |         | 2       | 340                       |         |
|         |            |         | 3       | 810                       |         |
|         |            |         | 4       | 450                       |         |
|         |            |         | 5       | 480                       |         |
|         |            |         | 6       | 480                       |         |
|         |            |         | 7       | 540                       |         |
|         |            |         | 8       | 660                       |         |
|         |            |         | 9       | 500                       |         |
|         |            |         | 10      | 590                       |         |
|         |            |         |         | 521                       | average |
| 5       | 8          | 0.925   | 1       | 160                       |         |
|         |            |         | 2       | 190                       |         |
|         |            |         | 3       | 150                       |         |
|         |            |         | 4       | 250                       |         |
|         |            |         | 5       | 270                       |         |
|         |            |         | 6       | 200                       |         |
|         |            |         | 7       | 130                       |         |
|         |            |         | 8       | 390                       |         |
|         |            |         | 9       | 210                       |         |
|         |            |         | 10      | 320                       |         |
|         |            |         |         | 227                       | average |
| 6       | 22         | 0.925   | 1       | 130                       |         |
|         |            |         | 2       | 90                        |         |
|         |            |         | 3       | 70                        |         |
|         |            |         | 4       | 90                        |         |
|         |            |         | 5       | 50                        |         |
|         |            |         | 6       | 80                        |         |
|         |            |         | 7       | 80                        |         |
|         |            |         | 8       | 90                        |         |
|         |            |         | 9       | 90                        |         |
|         |            |         | 10      | 90                        |         |
|         |            |         |         | 86 *                      | average |
| 7       | 28         | 0.923   | 1       | 70                        |         |
|         |            |         | 2       | 120                       |         |
|         |            |         | 3       | 80                        |         |
|         |            |         | 4       | 50                        |         |
|         |            |         | 5       | 180                       |         |
|         |            |         | 6       | 90                        |         |
|         |            |         | 7       | 70                        |         |
|         |            |         | 8       | 80                        |         |
|         |            |         | 9       | 120                       |         |
|         |            |         | 10      | 95                        | average |

\* Disregarded: Abnormal Run

We claim:

1. A method for testing the environmental stress crack resistance of a polymer article having a flat surface and susceptible to stress cracking with respect to time of failure which comprises the steps of
   a. providing a chemical stress crack agent and an electrically conductive liquid on at least one side of the flat surface of the polymer article,
   b. applying a uniform stress to the side of the flat surface of said article immediately opposite to the side in contact with said stress crack agent by urging a mechanical stress member against said side immediately opposite to the side in contact with said stress crack agent,
   c. providing an electrical potential between said conductive liquid and the opposite side of said flat surface, and
   d. recording the time of failure of said plastic article by the flow of an electric current between said liquid and said mechanical stress member which is indicative of the penetration of said liquid through stress cracks generated in said article due to the mechanical stress member and the chemical stress crack agent.

2. The method as set forth in claim 1 wherein the plastic articles are ethylene polymer articles.

3. The method as set forth in claim 2 wherein the ethylene polymer articles are injection molded containers having a sprue area on the bottom thereof and said stress member is applied on the inside thereof opposite said sprue area.

4. The method as set forth in claim 2 wherein the ethylene polymer articles are plaques.

5. The method as set forth in claim 2 wherein the stress crack agent is also the electrically conductive liquid.

6. Apparatus for testing the environmental stress crack resistance of plastic articles with respect to time of failure which comprises
   a. container means for holding a chemical stress crack agent, an electrically conductive liquid and at least one plastic article having a flat surface therein,
   b. at least one conductive mechanical stress member slideably mounted above said container means and insulated therefrom, said stress member contacting one side of the flat surface of said plastic article positioned on said container means with the immediate opposite sides of said flat surface of said plastic article contacting said chemical stress crack agent,
   c. voltage generating means electrically connected to said conductive liquid and to said mechanical stress member and
   d. recorder means electrically connected in series with said mechanical stress member and said voltage generating means whereby failure of the plastic article due to the leakage of said conductive liquid through said article is indicated by an electrical current flowing through said recorder, mechanical stress member and conductive liquid which is recorded as a function of the time.

7. The apparatus as set forth in claim 6 wherein the stress crack agent is also the electrically conductive liquid.

8. The apparatus as set forth in claim 6 wherein a bottom ring support is provided beneath the surface of said conductive liquid to support said polymer article with the axis of said stress member located substantially on the axis of said ring supports.

9. The apparatus as set forth in claim 6 wherein a perforated block having one vertical hole therein of a greater diameter than said stress member is provided beneath the surface of said conductive liquid to support said polymer article with the axis of said stress means located substantially on the axis of sad vertical hole in said perforated blocks.

10. The apparatus as set forth in claim 6 wherein a tray is provided located beneath the surface of said conductive liquid, said tray having at least one hole therein of a greater diameter than said stress member whose axis is located substantially on the axis of said stress member.

11. The apparatus as set forth in claim 6 wherein the plastic article to be tested is a film which is circumferentially clamped on the outside of said container means and said stress member depresses said film downwardly until the surface of said conductive liquid is contacted.

* * * * *